(12) United States Patent
Silver et al.

(10) Patent No.: US 10,082,065 B2
(45) Date of Patent: Sep. 25, 2018

(54) HEATING SYSTEM FOR AN EXHAUST GAS TREATMENT SYSTEM

(71) Applicant: PERKINS ENGINES COMPANY LIMITED, Eastfield (GB)

(72) Inventors: Ronald Silver, Peoria, IL (US); Paul Moore, Peterborough (GB); Igor Strashny, Wansford (GB); David Heaton, Yarwell (GB)

(73) Assignee: Perkins Engines Company Limited, Peterborough (GB)

(*) Notice: Subject to any disclaimer, the term of this patent is extended or adjusted under 35 U.S.C. 154(b) by 75 days.

(21) Appl. No.: 15/115,822

(22) PCT Filed: Jan. 20, 2015

(86) PCT No.: PCT/GB2015/050125
§ 371 (c)(1),
(2) Date: Aug. 1, 2016

(87) PCT Pub. No.: WO2015/118298
PCT Pub. Date: Aug. 13, 2015

(65) Prior Publication Data
US 2017/0009633 A1     Jan. 12, 2017

(30) Foreign Application Priority Data
Feb. 6, 2014  (EP) .................................... 14154104

(51) Int. Cl.
*F01N 3/00*   (2006.01)
*F01N 5/02*   (2006.01)
*F01N 3/20*   (2006.01)

(52) U.S. Cl.
CPC ............... *F01N 5/02* (2013.01); *F01N 3/208* (2013.01); *F01N 3/2066* (2013.01); *F01N 2610/102* (2013.01); *Y02T 10/24* (2013.01)

(58) Field of Classification Search
USPC .......... 60/274, 286, 295, 297, 300, 301, 303
See application file for complete search history.

(56) References Cited

U.S. PATENT DOCUMENTS 5,829,248 A * 11/1998 Clifton .................. F01N 3/2033
                                                              60/286
6,871,489 B2 * 3/2005 Tumati ................ F01N 13/0097
                                                              60/274

(Continued)

FOREIGN PATENT DOCUMENTS

DE   10 2010 041094 A1    3/2012
WO   WO 2011/133093 A1   10/2011

OTHER PUBLICATIONS

International Search Report Application No. PCT/GB15/050125 dated Feb. 20, 2015.

*Primary Examiner* — Binh Q Tran
(74) *Attorney, Agent, or Firm* — Miller, Matthias & Hull

(57) ABSTRACT

The present disclosure relates to a heating system for an exhaust gas treatment system. The heating system comprises a first heating element comprising a receiving surface for receiving a reductant fluid and a second heating element, which may surround the first heating element. The second heating element may be a thermocheminal or thermophysical device. In a first mode of operation the second heating element is arranged to receive thermal energy from engine exhaust gas. In second mode of operation the second heating element transfers thermal energy to heat the first heating element.

14 Claims, 3 Drawing Sheets

(56) References Cited

U.S. PATENT DOCUMENTS

| | | | | |
|---|---|---|---|---|
| 7,661,265 | B2 * | 2/2010 | Baumgartner | F01N 3/2066 422/170 |
| 8,336,302 | B2 * | 12/2012 | Nakahira | F01N 3/025 60/286 |
| 8,359,832 | B2 * | 1/2013 | Yi | B01F 3/04049 422/172 |
| 8,839,613 | B2 * | 9/2014 | Levin | F01N 5/02 165/10 |
| 2011/0023461 | A1 | 2/2011 | Strots et al. | |
| 2012/0045378 | A1 | 2/2012 | Soukhojak et al. | |
| 2014/0352279 | A1 * | 12/2014 | Gonze | F01N 3/021 60/274 |

\* cited by examiner

HEATING SYSTEM FOR AN EXHAUST GAS TREATMENT SYSTEM

CROSS-REFERENCE TO RELATED APPLICATION

This Application is a 35 USC § 371 US National Stage filing of International Application No. PCT/GB2015/050125 filed on Jan. 20, 2015, and claims priority under the Paris Convention to European Patent Application No. EP 14154104.5 filed on Feb. 6, 2014.

FIELD OF THE DISCLOSURE

Technical Field

The present disclosure relates to a heating system for an exhaust gas treatment system for an engine, which indirectly utilises waste heat to provide heating to a heating element for a reductant fluid.

Background of the Disclosure

Engines, for example internal combustion engines burning gasoline, diesel or biofuel, output various harmful substances which must be treated to meet current and future emissions legislation. Most commonly those substances comprise hydrocarbons (HC), carbon monoxides (CO), mono-nitrogen oxides ($NO_x$) and particulate matter, such as carbon (C), a constituent of soot. Some of those substances may be reduced by careful control of the operating conditions of the engine. However it is usually necessary to provide a system, such as an exhaust gas treatment system (also known as an aftertreatment system), downstream of the engine to treat at least some of those substances entrained in the exhaust fluid. Various systems for reducing and/or eliminating constituents in emissions are known. For example, it is known to provide an oxidation device, such as a diesel oxidation catalyst, to reduce or to eliminate hydrocarbons (HC) and/or carbon monoxide (CO). Oxidation devices generally include a catalyst to convert those substances into carbon dioxide and water, which are significantly less harmful.

In addition, it is known to use selective catalytic reduction (SCR) aftertreatment systems to reduce eliminate mono-nitrogen oxides ($NO_x$) in diesel combustion emissions by conversion to diatomic nitrogen ($N_2$) and water ($H_2O$) by catalytic reaction with reductant chemicals, such as ammonia ($NH_3$), entrained in the exhaust gas. Generally ammonia is not present in exhaust gas and must therefore be introduced upstream of a catalyst, typically by injecting a reductant fluid, such as a urea solution, into the exhaust gas. At sufficiently high temperatures (180° C. in the case of urea) the droplets in the solution evaporate and the urea decomposes and hydrolyses to produce ammonia. The reductant may be added to the exhaust gas and absorbed onto the catalyst before it reacts with the $NO_x$ in the exhaust gas passing through the SCR system. Where the reductant used is ammonia, it may be added to the exhaust gas as, for example, anhydrous ammonia, aqueous ammonia or urea which thermally decomposes into ammonia within the SCR system before being absorbed onto the catalyst.

By these methods, exhaust gas may be cleaned, meaning that a proportion of the harmful substances which would otherwise be released to atmosphere are instead converted to carbon dioxide ($CO_2$), nitrogen ($N_2$) and water ($H_2O$).

However, many SCR aftertreatment systems are limited to operating only when the temperature of the exhaust gas is in excess of the temperature at which reductant fluid starts to decompose. In the case of a urea SCR aftertreatment system, this temperature is 180° C., as that is the temperature at which urea starts to decompose into ammonia. In some prior art systems this disadvantage has been obviated by using other methods of heating the aftertreatment catalysts to ensure that the required temperature is reached as quickly as possible on start up and/or maintained.

U.S. Pat. No. 6,969,492 describes the use of a microwave generator to provide a heat source for the vaporiser which is positioned downstream of the metering point for the reductant. Alternatively, a heatable vaporising baffle plate may be used. U.S. Pat. No. 6,601,385 describes the use of an impactor which holds the reductant solution until the droplets have been evaporated. The heating of the baffle plate may be achieved by means of an electrical heat source.

SUMMARY OF THE DISCLOSURE

The present disclosure relates to a heating system for an exhaust gas treatment system, comprising:—
a first heating element comprising a receiving surface for receiving a reductant fluid;
a second heating element;
wherein in a first mode of operation the second heating element is arranged to receive thermal energy from engine exhaust gas and, in second mode of operation, transfer thermal energy to heat the first heating element.

The present disclosure further relates to an engine comprising:—
an exhaust gas treatment system configured to receive exhaust gas produced during operation of the engine, said exhaust gas treatment system comprising a reductant fluid injector and a catalyst located downstream of the reductant fluid injector;
an exhaust passage;
a heating system as claimed in any one of the preceding claims located downstream of the reductant fluid injector and upstream of the catalyst; and
an exhaust gas feedback passage fluidly coupled between the exhaust passage and the second heating element to convey a portion of exhaust gas to the second heating element.

The present disclosure further relates to a method of heating a reductant fluid in an exhaust gas treatment system, comprising the steps of:—
in a first mode of operation, transferring thermal energy from exhaust gas to a second heating element; and
in a second mode of operation, transferring thermal energy from the second heating element to a first heating element.

BRIEF DESCRIPTION OF THE DRAWINGS

A preferred embodiment of the heating system of the present disclosure will now be described, by way of example only, with reference to and as shown in the accompanying drawings in which:—

DETAILED DESCRIPTION OF THE DISCLOSURE

Figure 1:
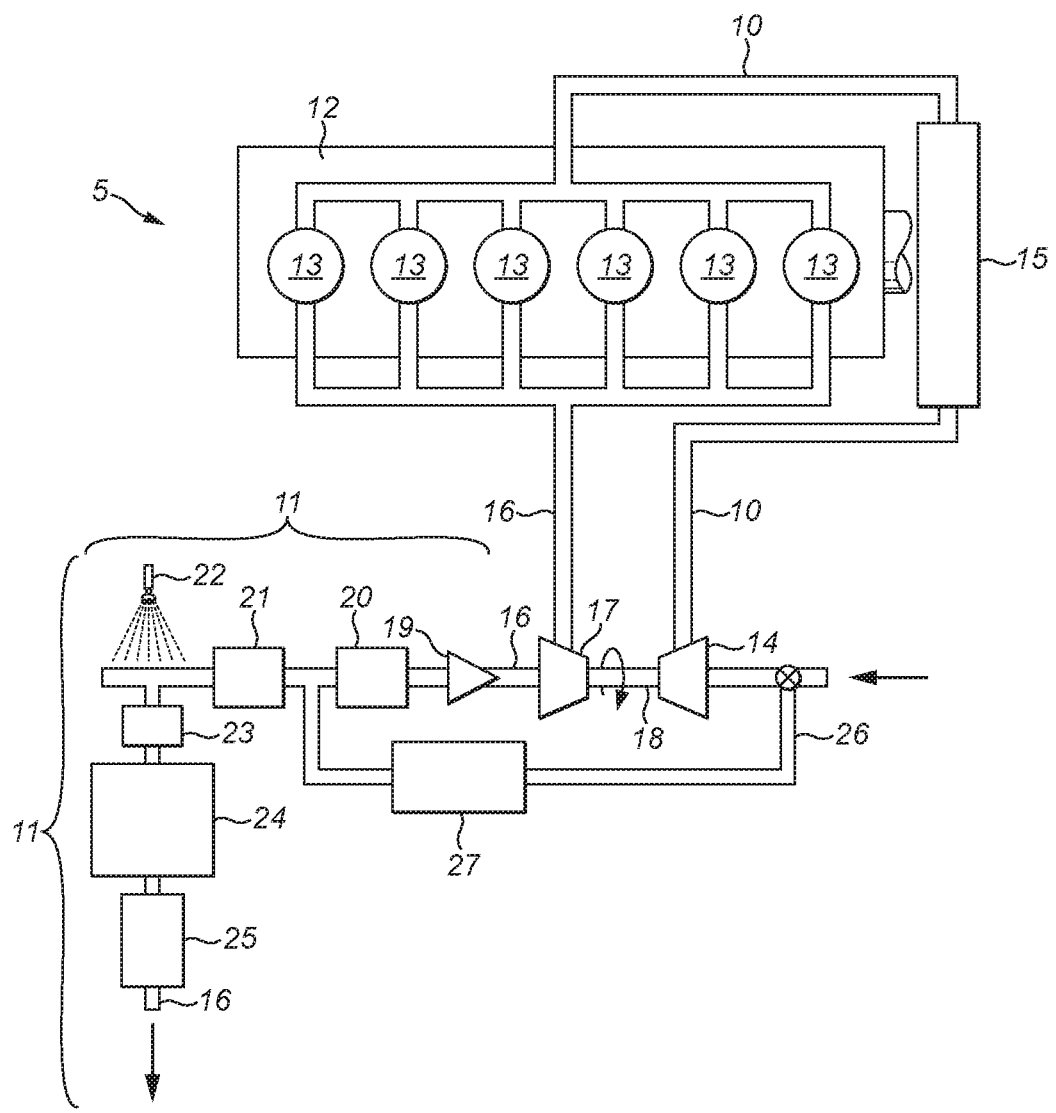
FIG. 1 is schematic diagram of an internal combustion engine comprising an exhaust gas treatment system and the heating system of the present disclosure.

FIG. 1 illustrates one example of an engine 5, such as a diesel internal combustion engine, with an exhaust gas treatment system 11. The engine 5 may be of any other type of combustion engine and may have additional features not illustrated or a different configuration.

In this example, the engine 5 may comprise, in brief, an engine block 12 housing a plurality of combustion chambers 13. A compressor 14 may be connected to the engine block 12 via an air inlet passage 10. An air cooler 15 may be located in the air inlet passage 10. A section of an exhaust passage 16 may connect the engine block 12 to a turbine 17. The turbine 17 may be drivably connected via a common shaft 18 to the compressor 14.

An outlet of the turbine 17 may be connected to the exhaust gas treatment system 11 by another section of the exhaust passage 16. The exhaust gas treatment system 11 may comprise an active regeneration device 19 and a diesel particulate filter 20 located in the exhaust passage 16. The diesel particulate filter 20 may remove particulates, such as soot, from the exhaust gas and the active regeneration device 19 may be used to remove the particulates from the diesel particulate filter 20 to prevent it from becoming clogged and to minimise the resulting effect on engine performance.

The exhaust gas treatment system 11 may comprise a selective catalytic reduction (SCR) device, which may comprise a diesel oxidation catalyst (DOC) 21, a reductant injector 22, an hydrolysis catalyst (H) 23, a catalyst substrate 24 and a further oxidation catalyst (AMOx) 25. The SCR device may receive exhaust gas from the turbine 17 and reduce constituents of the exhaust gas to innocuous gases. As in known exhaust gas treatment systems, a reductant fluid (also known as diesel emission fluid (DEF)), most commonly urea or a water/urea mixture, may be sprayed or otherwise advanced into the exhaust upstream of the catalyst substrate 24 by the reductant injector 22. As the reductant is absorbed onto the surface of catalyst substrate 24, the reductant may react with NOx (NO and $NO_2$) in the exhaust gas to form water ($H_2O$) and elemental nitrogen ($N_2$). In some embodiments, a hydrolysis catalyst (H) 23 may be associated with the catalyst substrate 24 to promote even distribution and conversion of the reductant fluid, such as urea, to the decomposition product, such as ammonia ($NH_3$).

The reduction process performed by catalyst substrate 24 may be most effective when a concentration of NO to $NO_2$ supplied to catalyst substrate 24 is about 1:1. To help provide the correct concentration of NO to $NO_2$, the diesel oxidation catalyst 21 may be located upstream of catalyst substrate 38. The diesel oxidation catalyst 21 may include a porous ceramic honeycomb structure or a metal mesh substrate coated with a material, for example a precious metal that catalyzes a chemical reaction to alter the composition of the exhaust. For example, diesel oxidation catalyst 21 may include platinum that facilitates the conversion of NO to $NO_2$, and/or vanadium that suppresses the conversion.

During operation of engine 5, it may be possible for too much urea to be injected into the exhaust (i.e. urea in excess of that required for appropriate $NO_x$ reduction). In this situation, known as "ammonia slip", some amount of ammonia may pass through catalyst substrate 24 to the atmosphere, if not otherwise accounted for. To minimize the magnitude of ammonia slip, the further oxidation catalyst ($AMO_x$) 25 may be located downstream of the catalyst substrate 24. The further oxidation catalyst ($AMO_x$) 25 may include a substrate coated with a catalyst that oxidizes residual $NH_3$ in the exhaust to form water and elemental nitrogen.

The exhaust gas treatment system 11 may also comprise a recirculation loop 26 for redirecting a proportion of the exhaust gas from the exhaust passage 16, after it has passed through the diesel particulate filter 20, back to the compressor 14. The recirculated exhaust gas may reduce the concentration of oxygen within the combustion chambers 13, and simultaneously lower the maximum combustion temperature therein. The reduced oxygen levels may provide fewer opportunities for chemical reaction with the nitrogen present, and the lower temperature may slow the chemical process that results in the formation of $NO_x$. A further air cooler 27 may be located within the recirculation loop 26 to cool the exhaust gas before compression.

The exhaust gas treatment system 11 of the present disclosure comprises a heating system 30 associated with the reductant injector 22. This heating system 30 provides a source of heat for the reductant fluid for situations where the temperature of the exhaust gas is insufficient to heat the reductant fluid to its vaporisation/decomposition temperature, for example during cold start of the engine 5. The reductant injector 22 may therefore be arranged to spray the reductant fluid into the heating system 30 upstream of the catalyst substrate 24.

The heating system 30 comprises first and second heating elements. The first heating element is a reductant mixing element 31 and provides a receiving surface onto which the reductant fluid is sprayed for heating the reductant fluid. In one mode of operation the first heating element is heated by the second heating element. The second heating element is a device, which may use a thermochemical or a thermophysical process effected by the heat from the aftertreated exhaust gas (waste heat) in one mode of operation and to raise the temperature of the reductant mixing element 31 in another mode of operation. This may be achieved either by thermal storage, i.e. storing the heat in an object such as molten salt (a thermophysical process) and releasing it at a later point in time, or by using the heat to effect a chemical reaction that can reversed again at a later point in time (a thermochemical process) to release heat. Examples of suitable devices for the second heating element are heat pumps and heat (thermal) batteries.

Figure 2:
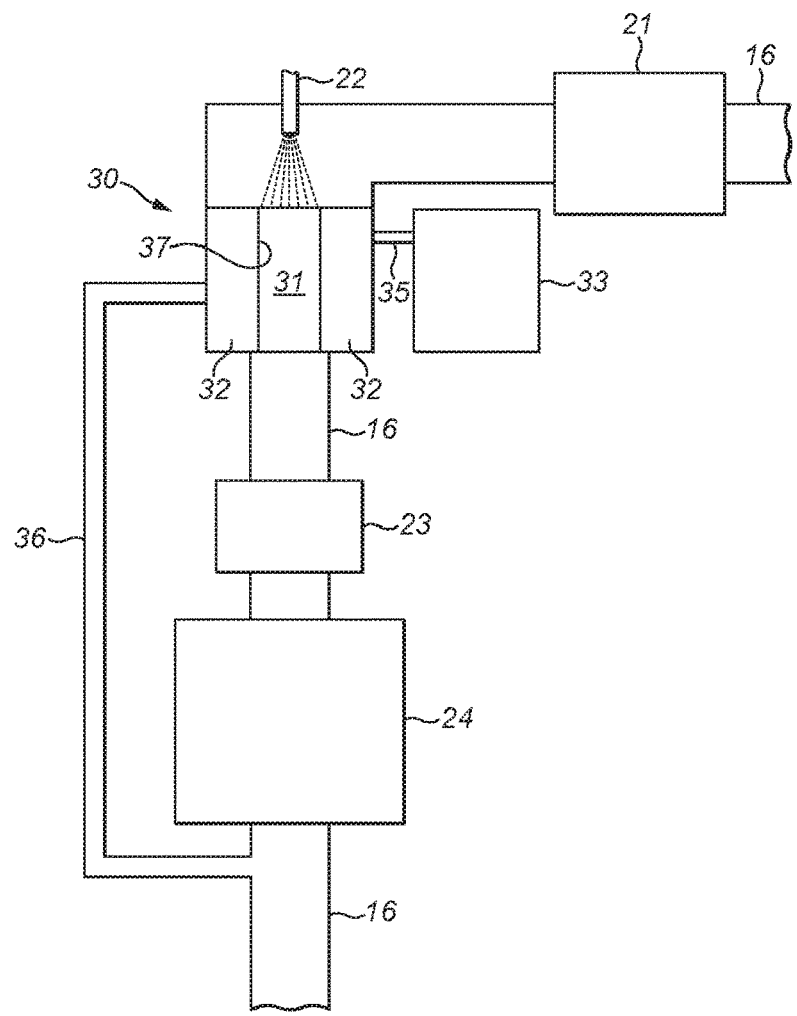
FIG. 2 is a schematic diagram of a section of the exhaust gas treatment system of FIG. 1, showing the heating system of the present disclosure in more detail.
Figure 3:
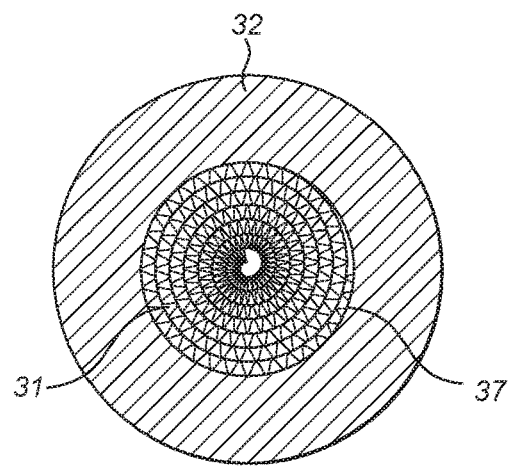
FIG. 3 is a cross section plan view of a section of the heating device and reductant mixing element of the heating system of FIG. 2.

FIGS. 2 and 3 illustrate a heating system 30 using a thermochemical process effected by a heat pump. A heating system 30 using a thermophysical process effected by a thermal battery may be configured in a different manner.

The reductant mixing element 31 may be made from a material which has high thermal conductivity properties, such as metal. Stainless steel may be a suitable metal due to the environmental conditions it operates in. Another suitable material may be FeCrAlY, which is a steel alloy especially well suited to being a catalyst support. The reductant mixing element 31 may be in the form of an extruded tube with a corrugated cross section. Such a structure provides multiple flow paths for the exhaust gas and to flow through and a large surface area for receiving the reductant fluid, which may improve the heat transfer rate. The design may be such that minimal resistance to the flow of exhaust gas is provided by the reductant mixing element 31 as it passes through. Thus any flow paths may be aligned with the flow direction of the exhaust gas. However other designs may be suitable which also provide these features.

Figure 4:
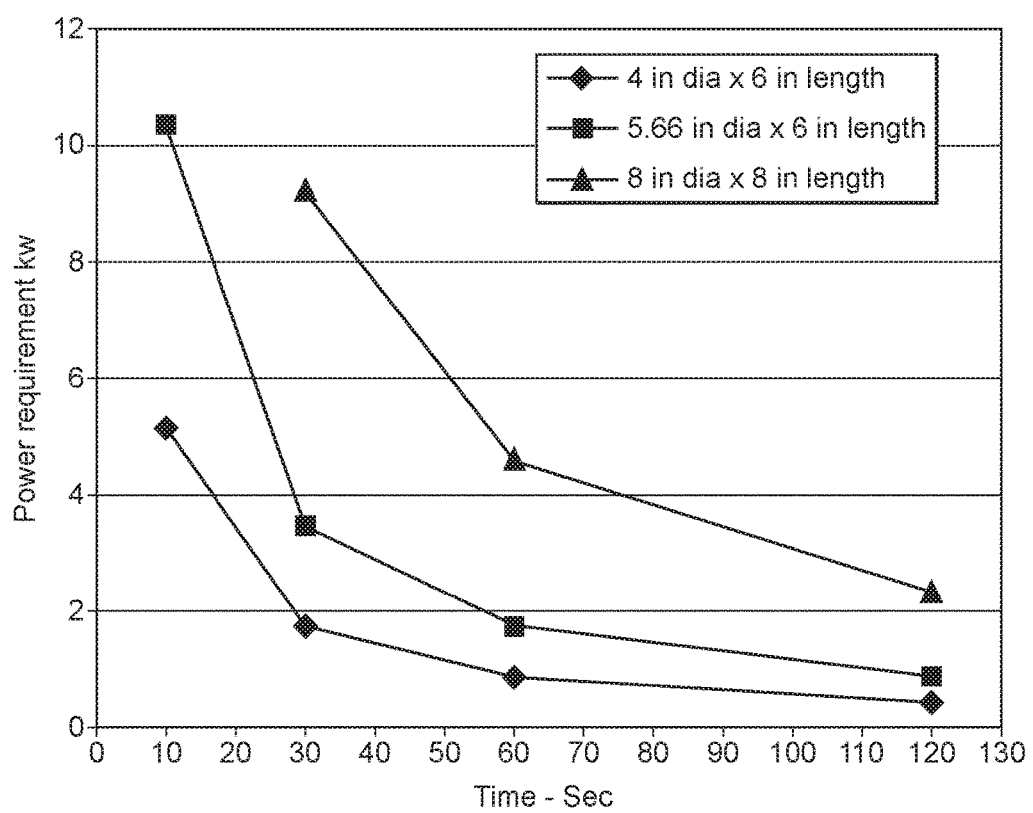
FIG. 4 is a graph illustrating the power required to heat a metallic substrate from 20° to 200° in a given time period.

The target temperature to which the reductant mixing element 31 may be heated may be at least the temperature at which the reductant fluid starts to decompose, i.e. 180° C. for urea. The target temperature may be above the reductant fluid decomposition temperature and may vary according to the design of the reductant mixing element 31, the operating mode of the engine 5 and the nature of the reductant fluid. This is partly illustrated in the graph of FIG. 4, which shows the power required to heat a metallic substrate from 20° to 200° C. over a limited time period for three different metal tubes of different lengths and diameters.

One suitable heat pump for use as the second heating element is described in US-A-2012/0060537 and may comprise an annular reactor vessel 32 and a condenser vessel 33. The vessels 32,33 may be fluidly linked together by a connecting pipe 35. A valve (not shown) may be located to enable the connecting pipe 35 to be closed so that the vessels 32, 33 may be isolated from each other. The reactor vessel 32 may contain an adsorbent, such as a metallic salt, and a working fluid, such as ammonia, which may be in the form of a salt bath. The reactor vessel 32 may be connected via an exhaust feedback passage 36 to a further section of the exhaust passage 16 to receive a portion of post-aftertreatment exhaust gas. The exhaust gas may be routed around an external surface of the reactor vessel 32 to provide a source of heat to the reactor vessel 32. The heat of the post-aftertreatment exhaust gas may be used to trigger an endothermic reaction to evaporate the working fluid in the reactor vessel 32. The exhaust gas may then be exhausted to atmosphere via an exhaust duct (not shown).

The first and second heating elements, or parts thereof, may be in direct contact with each other to enable heat transfer from the second to the first heating element. The reductant mixing element 31 may therefore be substantially cylindrical and may be partially, or wholly, surrounded by a part of the second heating element, such as the reactor vessel 32, which may be annular. The reactor vessel may therefore have an inner wall 37, which is made of a material which has good thermal conductivity properties, which provides a heat exchanging surface with the enclosed reductant mixing element 31. However in other configurations, the second heating element may transfer heat to the reductant mixing element 31 (i.e. the first heating element) in another manner.

INDUSTRIAL APPLICABILITY

During operation of the engine 5, pressurised air from the compressor 14 may be fed to the combustion chambers 13 via air cooler 15. After combustion the exhaust gas may pass through the exhaust passage 16 to drive the turbine 17, which is turn may drive the compressor 14. The exhaust gas may then be directed to the diesel particulate filter 20, which removes particulates from the exhaust gas. After the exhaust gas has passed through the diesel particulate filter 20, a portion of the exhaust gas may be returned to the compressor 14 where it may be mixed with inducted atmospheric air for compression.

The rest of the exhaust gas may be directed to the diesel oxidation catalyst 21 of the selective catalytic reduction device before passing into the heating system 30. Reductant fluid is sprayed onto the reductant mixing element 31 by the reductant injector 22. During normal operation of the engine 5, the temperature of the reductant mixing element may be maintained at a temperature of at least 200° C. by the heat from the exhaust gas, thereby raising the temperature of the reductant fluid. The droplets of the reductant fluid are vaporised and the active component (e.g. urea) decomposes and hydrolyses (e.g. to ammonia). The vaporised reductant mixes with the exhaust gas and is carried by the exhaust gas through the reductant mixing element 31 to the catalyst substrate 24. As the reductant is absorbed onto the surface of catalyst substrate 24, the reductant may react with NOx (NO and $NO_2$) in the exhaust gas to form water ($H_2O$) and elemental nitrogen ($N_2$). A portion of the aftertreated exhaust gas is directed back to the heating system 30 to charge the second heating element and the rest of the treated exhaust gas is exhausted to atmosphere via a final section of the exhaust passage 16 and an exhaust outlet.

During normal operation of the engine 5, the second heating element operates in a first mode of operation. In this mode, thermal energy from the aftertreated exhaust gas may be used to cause an endothermic reaction in which the working fluid in the reactor vessel 32 is endothermically evaporated from the adsorbent. The resulting vapor may pass through the connecting pipe 35 to the condenser vessel 33 leaving a dry solid adsorbent in the reactor vessel 32. The vapor may collect in the condenser vessel 33 and may be cooled to provide liquid working fluid in the condenser vessel 33. When the operation of the engine 5 is terminated, the valve may be closed leaving the vessels 32,33 isolated from each other. As a result of the evaporation process, a partial vacuum forms in the reactor vessel 32. The second heating element is thus charged ready for use.

When the engine 5 is next started after a period of inactivity, the temperature of the reductant mixing element 31 may have dropped to a temperature that is below the temperature required for decomposition of the reductant fluid. The initial temperature of the exhaust gas may also be insufficient to heat the reductant fluid to the requisite decomposition temperature. To enable the selective catalytic reduction device to operate immediately on start-up of the engine, the heating system 30 may be activated and the second heating element operates in a second mode of operation. Activation of the heating system 30 may be controlled by the engine control module (ECM). On activation, the valve may be opened to re-establish the fluid link between the vessels 32, 33. As a result of the partial vacuum in the reactor vessel 32, the working fluid in the condenser vessel 33 may evaporate and passes back into the reactor vessel 32 where it may be exothermically adsorbed by the dry salt, thereby releasing heat. Thermal energy may be conducted to the reductant mixing element 31 via the inner wall 37 of the reactor vessel 32 and may effect a rapid increase in the temperature of the reductant mixing element 31. As the reductant fluid is sprayed onto the reductant mixing element 31, it impacts the hot surfaces thereof, resulting in a rapid evaporation of any water content of the reductant fluid and a rapid hydrolysis reaction of the reductant fluid. In a urea SCR, the urea is heated and decomposes rapidly to ammonia, thus avoiding urea deposit formation. Once the engine 5 is warmed up, the exhaust gas may be used to re-evaporate the working fluid in the reactor vessel 32. The recharging of the second heating element may be controlled by the valve in the connecting pipe 35 between the vessels 32,33. This valve may be controlled by the ECM and may depend on a number of engine and exhaust parameters.

The heating system 30 thus enables the improvement of cold start activity by raising the temperature of the reductant mixing element 31 so that injection of the reductant fluid may begin before the exhaust gas has reached the required temperature for decomposition of the reductant. This is a particular issue for a reductant fluid such as urea, as heat is required to release the ammonia.

The invention claimed is:

1. A heating system for an exhaust gas treatment system, comprising:
   a first heating element comprising a plurality of flow passages and a receiving surface for receiving a reductant fluid; and
   a second heating element;
   wherein in a first mode of operation the second heating element is arranged to receive thermal energy from engine exhaust gas and, in a second mode of operation, transfer thermal energy to heat the first heating element.

2. The heating system as claimed in claim 1 in which the first heating element is at least partially surrounded by and in contact with at least a part of the second heating element.

3. The heating system as claimed in claim 1 in which the second heating element is a device which utilises thermal energy from exhaust gas to effect a thermochemical or a thermophysical process.

4. The heating system as claimed in claim 3 which the second heating element is a heat pump or a heat battery.

5. The heating system as claimed in claim 4 which the second heating element is a heat pump comprising a reactor vessel and a condenser vessel fluidly linked by a connecting pipe and a valve operable to open and close the connecting pipe.

6. The heating system as claimed in claim 1 in which the reductant fluid is urea or a urea composition.

7. An engine comprising:
   an exhaust gas treatment system configured to receive exhaust gas produced during operation of the engine, said exhaust gas treatment system comprising a reductant fluid injector and a catalyst located downstream of the reductant fluid injector;
   an exhaust passage;
   a heating system located downstream of the reductant fluid injector and upstream of the catalyst; the heating system comprising:
      a first heating element having a plurality of flow passages and a receiving surface for receiving a reductant fluid; and
      a second heating element;
      wherein in a first mode of operation the second heating element is arranged to receive thermal energy from engine exhaust gas and, in a second mode of operation, transfer thermal energy to heat the first heating element; and
   an exhaust gas feedback passage fluidly coupled between the exhaust passage and the second heating element to convey a portion of exhaust gas to the second heating element.

8. The engine as claimed in claim 7 which the exhaust gas feedback passage is fluidly coupled to the exhaust passage downstream of the exhaust gas treatment system.

9. A method of heating a reductant fluid in an exhaust gas treatment system of an engine, comprising the steps of:
   in a first mode of operation, transferring thermal energy from exhaust gas to a second heating element; and
   in a second mode of operation, transferring thermal energy from the second heating element to a first heating element, the first heating element comprising a receiving surface for receiving the reductant fluid.

10. The method as claimed in claim 9 in which thermal energy from the exhaust gas is used to effect a thermochemical or a thermophysical process in the second heating element.

11. The method as claimed in claim 10 in which, in the first mode of operation, the exhaust gas is used to effect a thermochemical process comprising the steps of evaporating a working fluid from an adsorbent in a first vessel in an endothermic reaction, passing the vapour to a second vessel having a fluid connection with the first vessel, condensing the vapour and closing the fluid connection between the vessels, wherein a partial vacuum is formed in the first vessel.

12. The method as claimed in claim 10 in which, in the second mode of operation, the fluid connection between the vessels is opened and the working fluid in the second vessel evaporates and passes into the first vessel in which it is exothermically adsorbed by the adsorbent, thereby releasing heat and heating the first heating element.

13. The method as claimed in claim 12 wherein, in the second mode of operation, reductant fluid is introduced onto the first heating element, whereby it is heated to a temperature at which the reductant fluid decomposes.

14. The method as claimed in claim 9, in which the reductant fluid is urea or a urea composition and the first heating element is heated by the second heating element to at least 180° C.

* * * * *